United States Patent
Yonemoto (10) Patent No.: US 10,075,601 B2
(45) Date of Patent: Sep. 11, 2018

(54) DOCUMENT CONVEYING DEVICE AND IMAGE FORMING APPARATUS

(71) Applicant: KYOCERA Document Solutions Inc., Osaka (JP)

(72) Inventor: Satoru Yonemoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/677,676

(22) Filed: Aug. 15, 2017

(65) Prior Publication Data

US 2018/0077308 A1    Mar. 15, 2018

(30) Foreign Application Priority Data

Sep. 15, 2016  (JP) .................................. 2016-180726

(51) Int. Cl.
| | |
|---|---|
| *H04N 1/04* | (2006.01) |
| *H04N 1/00* | (2006.01) |
| *H04N 1/203* | (2006.01) |
| H04N 1/053 | (2006.01) |
| G06F 3/12 | (2006.01) |

(52) U.S. Cl.
CPC ....... *H04N 1/00572* (2013.01); *H04N 1/2032* (2013.01); *G06F 3/1243* (2013.01); *H04N 1/00745* (2013.01); *H04N 1/00748* (2013.01); *H04N 1/053* (2013.01)

(58) Field of Classification Search
None
See application file for complete search history.

(56) References Cited

U.S. PATENT DOCUMENTS

| | | | |
|---|---|---|---|
| 6,438,350 B1 * | 8/2002 | Hasegawa | H04N 1/00572 358/498 |
| 6,581,923 B2 * | 6/2003 | Takamatsu | G03G 15/60 271/125 |
| 8,047,533 B2 * | 11/2011 | Kuo | B65H 3/0684 271/109 |
| 8,149,476 B2 * | 4/2012 | Hamada | H04N 1/00546 358/474 |

(Continued)

FOREIGN PATENT DOCUMENTS

| | | |
|---|---|---|
| JP | 2005-167477 A | 6/2005 |
| JP | 2005167477 A * | 6/2005 |

*Primary Examiner* — Dung D Tran
(74) *Attorney, Agent, or Firm* — Studebaker & Brackett PC (57) ABSTRACT

A document conveying device is used in common for a double-sided reading specification in which images on one face and the other face of a document conveyed along a conveying path are read and for a single-sided reading specification in which the image on the one face of the document is read. The document conveying device includes a recess, a cover member and a supporting part. In the recess, a member dedicated to the double-sided reading specification is supported at the double-sided reading specification. The member dedicated to the double-sided reading specification is used for reading the image on the other face. The cover member closes the recess at the single-sided reading specification. By the supporting part, the member dedicated to the double-sided reading specification is detachably supported at the double-sided reading specification and the cover member is detachably supported at the single-sided reading specification.

6 Claims, 9 Drawing Sheets

(56) References Cited

U.S. PATENT DOCUMENTS

| | | | |
|---|---|---|---|
| 9,131,092 B2 * | 9/2015 | Ito | H04N 1/00554 |
| 9,832,331 B2 * | 11/2017 | Ogasawara | H04N 1/00795 |
| 2013/0242359 A1 * | 9/2013 | Heishi | H04N 1/00628 |
| | | | 358/498 |
| 2013/0320611 A1 * | 12/2013 | Kubo | B65H 3/0615 |
| | | | 271/114 |

* cited by examiner

DOCUMENT CONVEYING DEVICE AND IMAGE FORMING APPARATUS

INCORPORATION BY REFERENCE

This application is based on and claims the benefit of priority from Japanese Patent application No. 2016-180726 filed on Sep. 15, 2016, which is incorporated by reference in its entirety.

BACKGROUND

The present disclosure relates to a document conveying device which conveys a document and to an image forming apparatus including the document conveying device.

A document conveying device which conveys a document along a conveying path may be attached to an image forming apparatus. The document conveying device is provided with a reading unit configured to read an image on the conveyed document. Based on the read image, the image forming apparatus forms an image on a sheet.

The document conveying device is sometimes used in common for both a double-sided reading specification and a single-sided reading specification. In the double-sided reading specification, images on both faces (a front face and a back face) of the document are read by one-time conveying of the document along the conveying path. In the single-sided reading specification, the image on one face (the front face) of the document is read by one-time conveying of the document along the conveying path. Such a document conveying device has a member dedicated to the double-sided reading specification. The dedicated member is attached to a storage space which is formed in a guide for guiding the document along the conveying path. By attaching the dedicated member to the storage part, it becomes possible to change the document conveying device from the single-sided reading specification into the double-sided reading specification.

The above described document conveying device is provided with a lid which covers the storage part when changed into the single-sided reading specification. The lid is configured to be placed and adhered around the storage part. Thereby, an attachment and detachment work of the lid is not carried out easily. Additionally, it is difficult to change the document conveying device into the double-sided reading specification again after changed into the single-sided reading specification.

SUMMARY

In accordance with an aspect of the present disclosure, a document conveying device is used in common for a double-sided reading specification in which images on one face and the other face of a document conveyed along a conveying path are read and for a single-sided reading specification in which the image on the one face of the document is read. The document conveying device includes a recess, a cover member and a supporting shaft. In the recess, a member dedicated to the double-sided reading specification is supported at the double-sided reading specification. The member dedicated to the double-sided reading specification is used for reading the image on the other face. The cover member closes the recess at the single-sided reading specification. By the supporting part, the member dedicated to the double-sided reading specification is detachably supported at the double-sided reading specification and the cover member is detachably supported at the single-sided reading specification.

In accordance with an aspect of the present disclosure, the image forming apparatus forms an image based on an image on the document conveyed by the above described document conveying device.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, a document conveying device and an image forming apparatus according to one embodiment of the present disclosure will be described.

Figure 1:
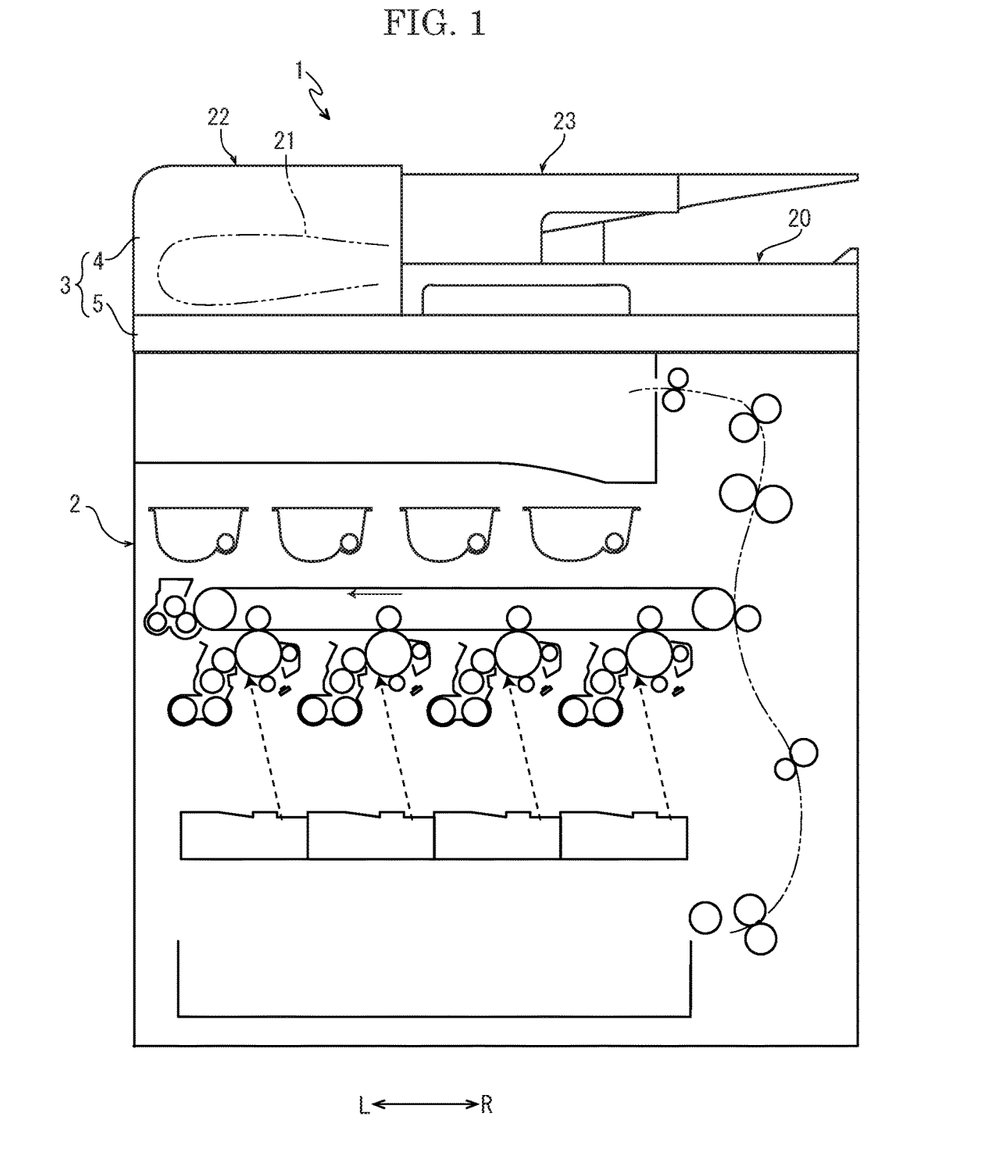
FIG. 1 is a front view schematically showing an image forming apparatus and a document conveying device according to one embodiment of the present disclosure.

With reference to FIG. 1, an entire structure of a color printer 1 will be described. FIG. 1 is a front view schematically showing an entire structure of the color printer 1. In the following description, a near side of a paper plan of FIG. 1 is defined to be a front side of the color printer 1, and a left-right direction is defined based on the direction in which the printer 1 is viewed from the front side. Fr, Rr, L and R shown in each figure respectively show the front, rear, left and right sides of the color printer 1.

The color printer 1 includes an image forming apparatus 2 and a document conveying device 3 disposed on the image forming apparatus 2, as shown in FIG. 1. The document conveying device 3 is configured to convey a document automatically and to read images on both faces (a front face and a back face) or an image on one face (a front face) of the conveyed document. The image forming apparatus 2 is configured to form an image according to the image read by the document conveying device 3 on both faces or one face of a sheet.

Figure 2:
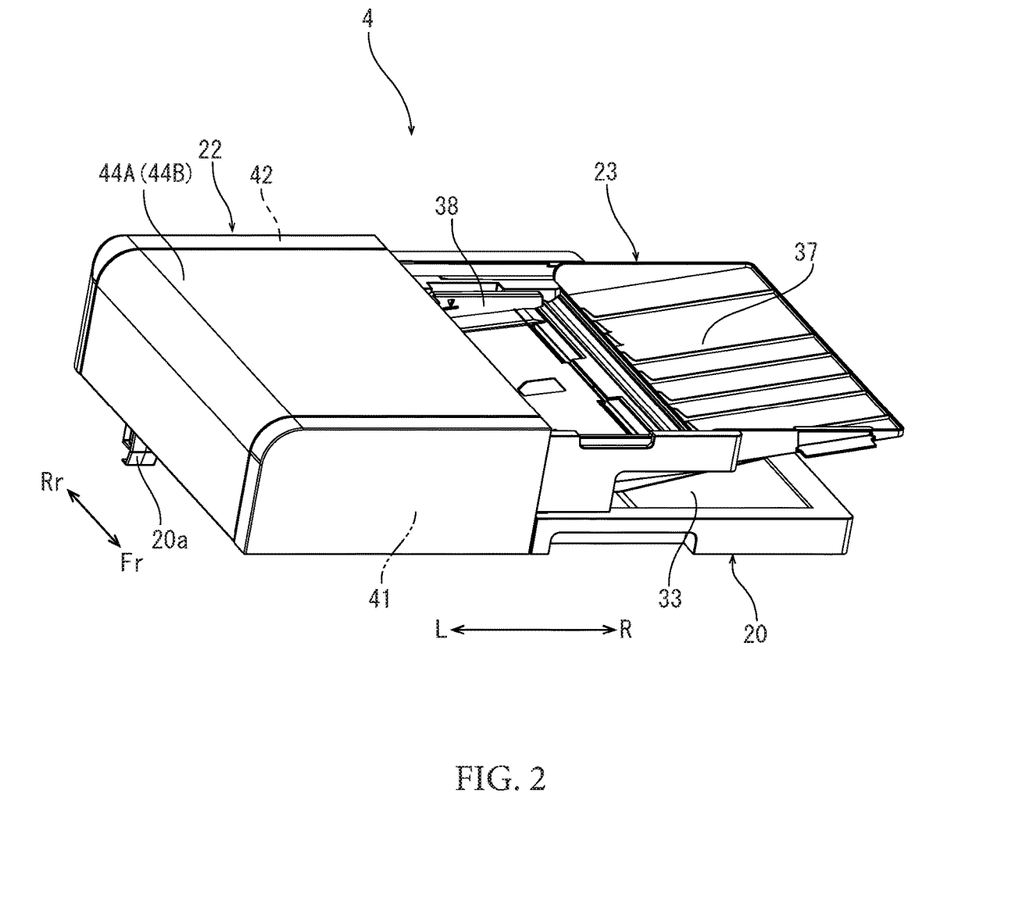
FIG. 2 is a perspective view showing a document conveying unit of the document conveying device according to the embodiment of the present disclosure.
Figure 3:
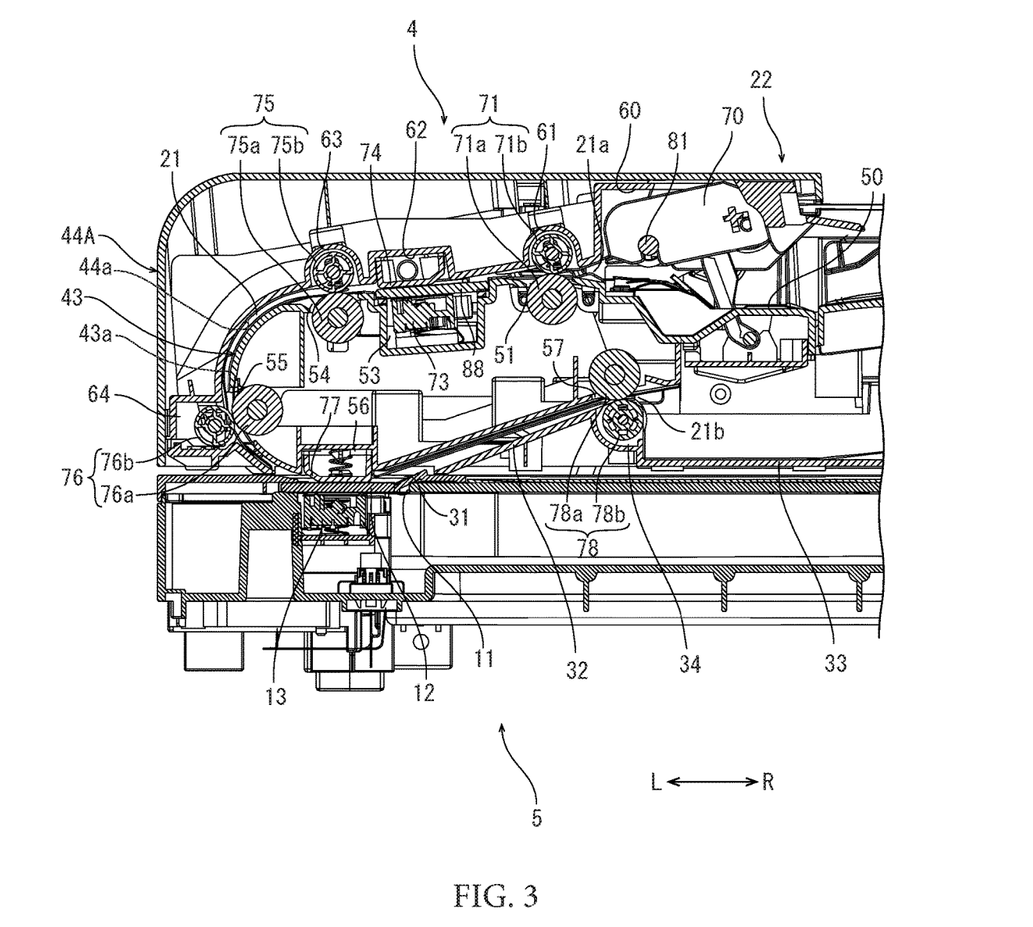
FIG. 3 is a side sectional showing a conveying part in a double-sided reading specification, in the document conveying device according to the embodiment of the present disclosure.
Figure 4:
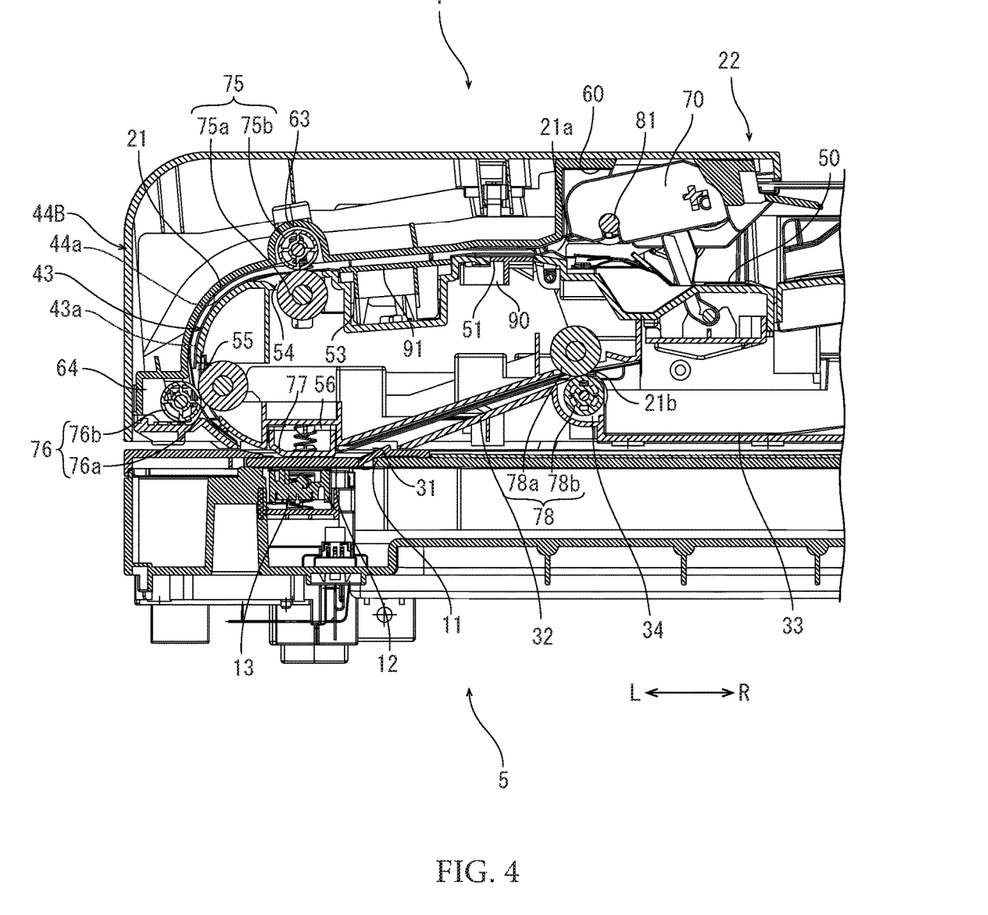
FIG. 4 is a side sectional view showing the conveying part in a single-sided reading specification, in the document conveying device according to the embodiment of the present disclosure.

With reference to FIG. 1 and FIG. 2 to FIG. 4, the document conveying device 3 will be described. FIG. 2 is a perspective view showing a document conveying unit of the document conveying device, FIG. 3 is a side sectional view showing a conveying part of the document conveying device for a double-sided reading specification, and FIG. 4 is a side sectional view showing the conveying part of the document conveying device for a single-sided reading specification.

As shown in FIG. 1, the document conveying device 2 includes a document conveying unit 4 and a reading unit 5. The document conveying unit 4 is configured to convey the document automatically in a predetermined conveying direction and to read the image on the one face (the back face) of the document. The reading unit 5 is configured to read the image on the other face (the front face) of the document. The document conveying unit 4 is disposed on the reading unit 5.

Firstly, the reading unit 5 will be described with reference to FIG. 1, FIG. 3 and FIG. 4. The reading unit 5 is formed into a shallow approximately parallelepiped rectangular shape capable of being placed on an upper face of the image forming apparatus 2, as shown in FIG. 1. As shown in FIG. 3 and FIG. 4, on a left end portion of an upper face of the reading unit 5, a window 11 is formed along a width direction perpendicular to the conveying direction for the document. The window 11 is covered with a contact glass 12. Below the window 11, a contact image sensor 13 configured to read the image on the front face of the document is provided.

Next, the document conveying unit 4 will be described. As shown in FIG. 1 and FIG. 2, the document conveying unit 4 includes a base part 20, a conveying part 22 and a document placement part 23. The base part 20 is configured to be attached on the upper face of the reading unit 5. The conveying part 22 is provided on a left half of an upper face of the base part 20 and configured to form a conveying path 21 along which the document is conveyed in the conveying direction. The document placement part 23 on which the document to be conveyed is placed is supported by the conveying part 22.

The base part 20 is a member capable of being placed on the upper face of the reading unit 5. As shown in FIG. 2, the base part 20 has two legs 20a which positions the document conveying unit 4 with respect to the reading unit 5.

As shown in FIG. 3 and FIG. 4, the base part 20 has a window 31 facing the window 11 of the reading unit 5 at the left end portion. The base part 20 further has an outer guide plate 32 and an ejection tray 33 which are formed continuously from a right side edge of the window 31. The outer guide plate 32 is inclined in the right upper direction to form a part of an outer circumferential side guide face of the conveying path 21. At a right side end portion of the outer guide plate 32, a conveying roller storage recess 34 is formed. The ejection tray 33 is gradually inclined in the right upper direction from the conveying roller storage recess 34.

The conveying part 22 has front and rear side plates 41 and 42, an inner guide plate 43 as an example of a guide member and outer covers 44A and 44B. The front and rear side plates 41 and 42 facing each other in the front-rear direction are formed along almost left halves of front and rear edges of the base part 20. The inner guide plate 43 has a horizontally laid U-shaped cross section (refer to FIG. 3 and FIG. 4). The inner guide plate 43 is supported between the front and rear side plates 41 and 42 such that both side edges of the inner guide plate 43 in the width direction are fixed to center portions of the front and rear side plates 41 and 42 in the upper-lower direction. Each of the outer covers 44A and 44B is supported by a left end portion of the base part 20 in a turnable manner around its left end so as to cover outer faces of the front and rear side plates 41 and 42, and an upper side and a left side of the inner guide plate 43.

As shown in FIG. 2, the document placement part 23 is a rectangular plate-shaped member having a document placement face 37 on which the predetermined size document is placed. On the document placement face 37, side cursors 38 are supported in a slidable manner in the width direction so as to align the document in the width direction. The document placement part 23 is supported by the front and rear side plates 41 and 42 above the ejection tray 33 with a posture inclined downward toward the conveying part 22.

Figure 5:
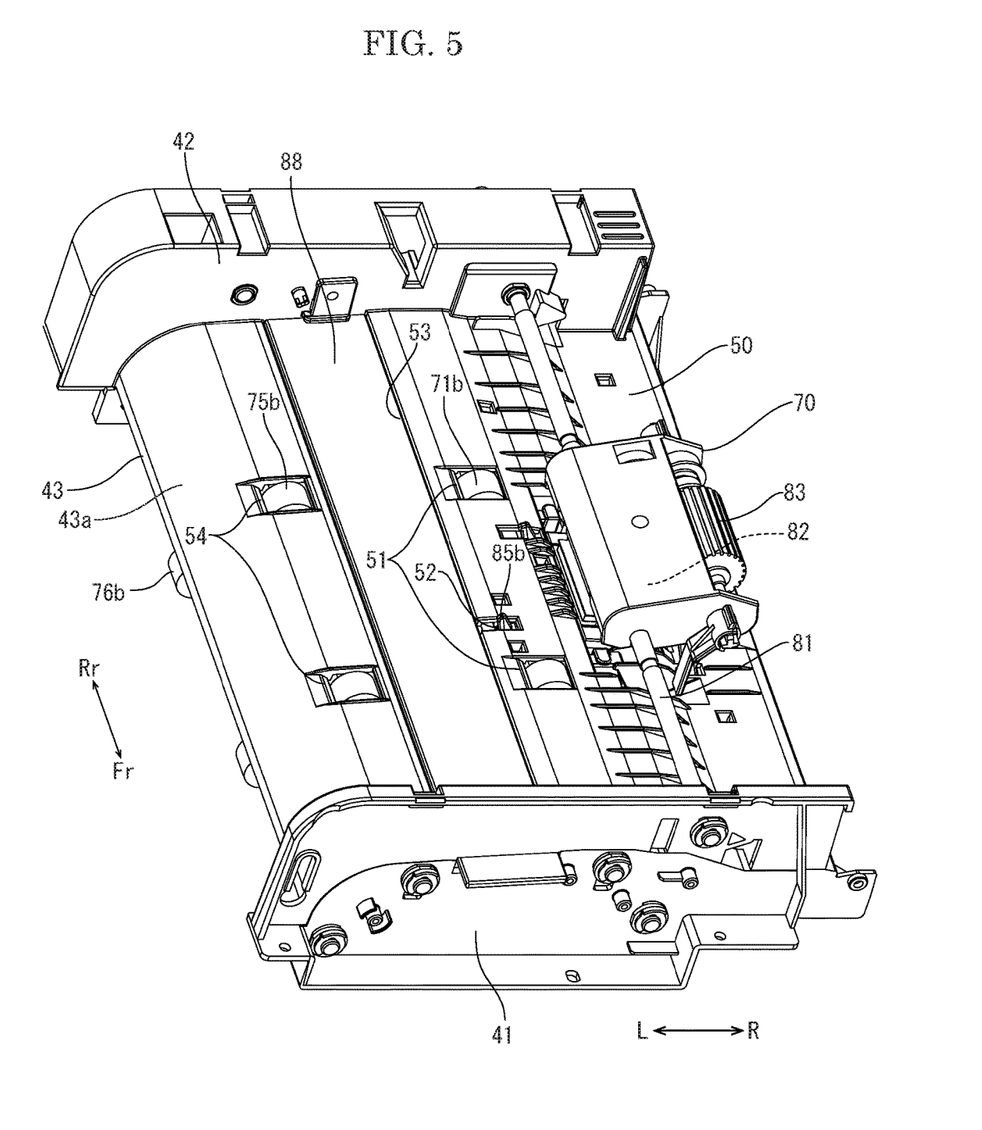
FIG. 5 is an upper side perspective view showing the conveying part in the double-sided reading specification, in the document conveying device according to the embodiment of the present disclosure.
Figure 6:
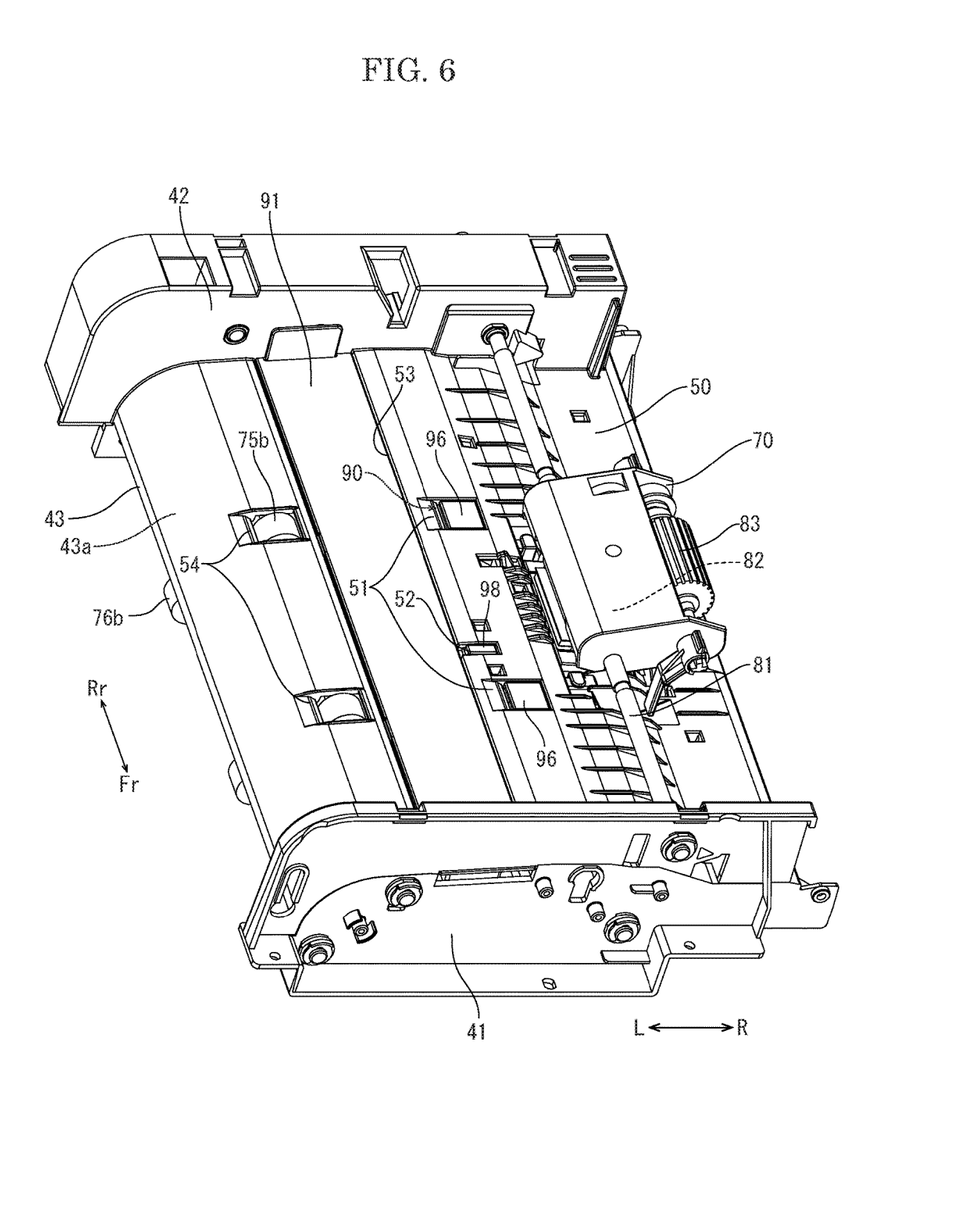
FIG. 6 is an upper side perspective view showing the conveying part in the single-sided reading specification, in the document conveying according to the embodiment of the present disclosure.
Figure 7:
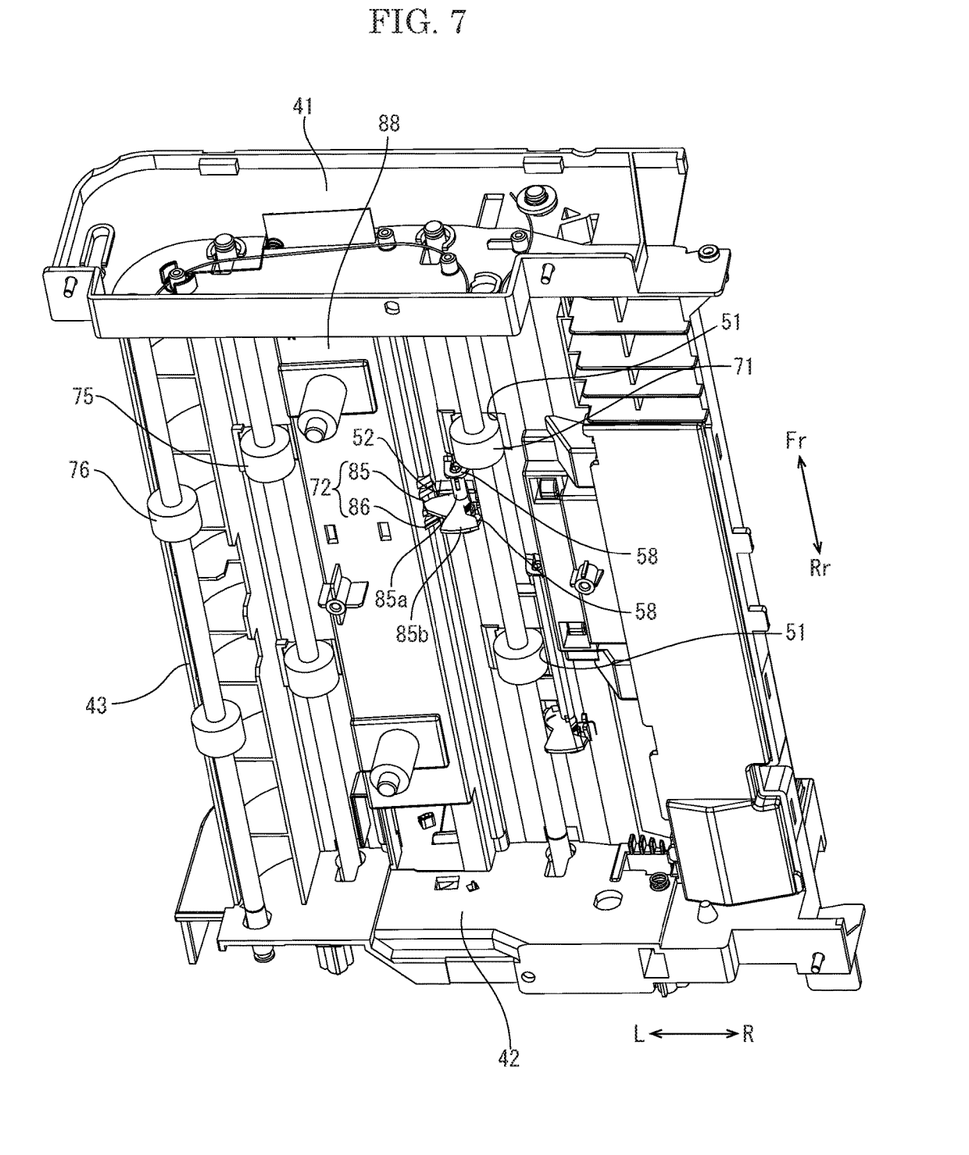
FIG. 7 is a lower side perspective view showing the conveying part in the double-sided reading specification, in the document conveying device according to the embodiment of the present disclosure.
Figure 8:
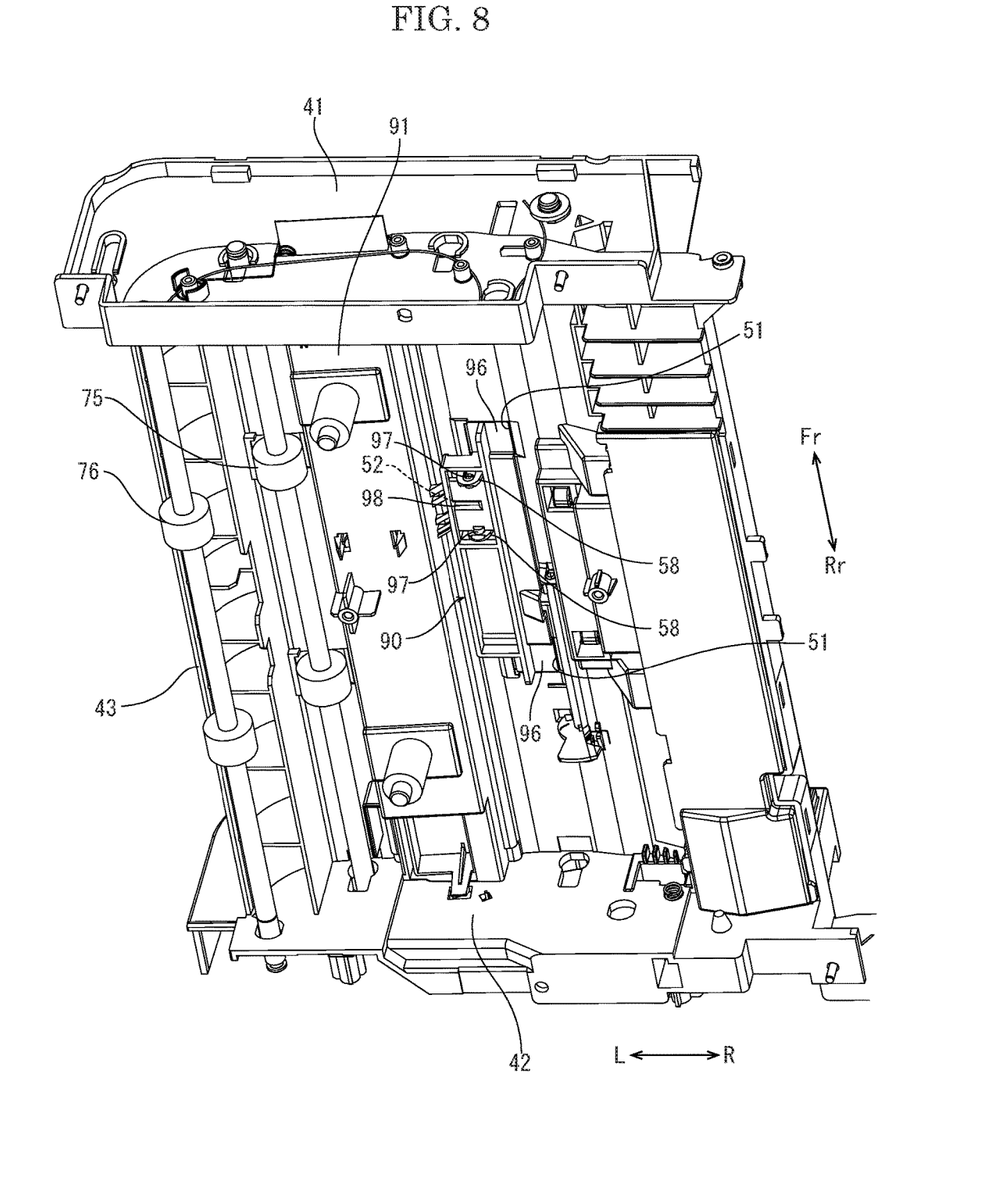
FIG. 8 is a lower side perspective view showing the conveying part in the single-sided reading specification, in the document conveying device according to the embodiment of the present disclosure.

Next, the conveying part 22 will be described in detail with reference to FIG. 3 and FIG. 4, and FIG. 5 to FIG. 8. FIG. 5 is a perspective view showing the conveying part for the double-sided reading specification when viewed from the upper side, FIG. 6 is a perspective view showing the conveying part for the single-sided reading specification when viewed from the upper side, FIG. 7 is a perspective view showing the conveying part for the double-sided reading specification when viewed from the lower side and FIG. 8 is a perspective view showing the conveying part for the single-sided reading specification when viewed from the lower side.

As shown in FIG. 3 and FIG. 4, an outer face of the inner guide plate 43 forms an inner circumferential side guide face 43a of the conveying path 21. An inner face of each of the outer covers 44A and 44B forms the outer circumferential side guide face 44a of the conveying path 21. The conveying path 21 is formed between the guide face 43a of the inner guide plate 43 and the guide face 44a of each of the outer covers 44A and 44B and between the guide face 43a of the inner guide plate 43 and the guide face of the outer guide plate 32 of the base part 20. The conveying path 21 extends leftward from an upper inlet 21a, curves downward in an arc shape and then extends rightward to a lower outlet 21b, like a horizontally lied U-shape.

The guide face 43a of the inner guide plate 43 will be described. On the guide face 43a of the inner guide plate 43, a document placement portion 50, a first conveying roller opening 51 as an example of a recess, a document detection sensor opening 52 as an example of a recess (refer to FIG. 5), a reading sensor storage recess 53, a second conveying roller opening 54, a third conveying roller opening 55, a pressing member storage recess 56 and a fourth conveying roller opening 57 are formed in the order in the conveying direction.

The document placement portion 50 is formed on the upstream side of the inlet 21a in the conveying direction. The document placement portion 50 continuous to the document placement part 23 so that a leading portion of the document is placed thereon. On the document placement portion 50, a plurality of ribs are formed along the conveying direction.

The first to fourth conveying roller openings 51, 54, 55 and 57 each have two rectangular openings arranged at a predetermined interval in the width direction. The first conveying roller opening 51 is formed at the inlet 21a of the conveying path 21. The second conveying roller opening 54 is formed on the upstream side of the curved path of the conveying path 21 in the conveying direction. The third conveying roller opening 55 is formed at the curved path of the conveying path 21. The fourth conveying roller opening 57 is formed at the outlet 21b of the conveying path 21. The fourth conveying roller opening 57 faces the conveying roller storage recess 34 via the conveying path 21.

As shown in FIG. 5 and FIG. 6, the document detection sensor opening 52 has a rectangular shape long in the conveying direction, and is formed at a front side portion between the two openings of the first conveying roller opening 51. As shown in FIG. 7 and FIG. 8, on a face opposite to the guide face 43a of the inner guide plate 43 (a face opposite to the conveying path 21), two bearing pieces 58 are formed as a bearing part which is an example of a supporting part. The bearing pieces 58 protrude downward from both sides of the document detection sensor opening 52 in the width direction. The bearing pieces 58 are elastically deformable, and have bearing holes aligned on the same axis along the width direction.

As shown in FIG. 3 and FIG. 4, the reading sensor storage recess 53 has a horizontally long rectangular shaped cross-section, and is formed along the width direction. The pressing member storage recess 56 has a horizontally long rectangular shaped cross-section, and is formed along the width direction. The pressing member storage recess 56 faces the window 31.

Next, the guide face 44a of each of the outer covers 44A and B will be described. The guide face 44a is different in shape for the double-sided reading specification and for the single-sided reading specification.

First, with reference to FIG. 3, the outer cover 44A for the double-sided reading specification will be described. On the guide face 44a of the outer cover 44A, a holder storage recess 60, a first conveying roller storage recess 61, a pressing roller storage recess 62, a second conveying roller storage recess 63 and a third conveying roller storage recess 64 are formed in the order in the conveying direction.

The holder storage recess 60 faces the document placement portion 50 of the inner guide plate 43. The first to third conveying roller storage recesses 61, 63 and 64 respectively face the first to third conveying roller openings 51, 54 and 55 of the inner guide plate 43 via the conveying path 21. The pressing roller storage recess 62 faces the reading sensor storage recess 53 of the inner guide plate 43 via the conveying path 21.

With reference to FIG. 4, the outer cover 44B for the single-sided reading specification will be described. On the guide face 44a of the outer cover 44B, the holder storage recess 60, the second conveying roller storage recess 63 and the third conveying roller storage recess 64 are formed in the order in the conveying direction.

The holder storage recess 60 faces the document placement portion 50 of the inner guide plate 43. The second and third conveying roller storage recesses 63 and 64 respectively face the second and third conveying roller openings 54 and 55 of the inner guide plate 43 via the conveying path 21.

Next, the conveying path 21 for the double-sided reading specification and for the single-sided reading specification will be described with reference to FIGS. 3 to 8.

First, the conveying path 21 for the double-sided reading specification will be described with reference to FIG. 3, FIG. 5 and FIG. 7. On the conveying path 21, a feed holder 70, first conveying rollers 71, a document detection sensor 72 (refer to FIG. 7), a contact image sensor 73 and a first pressing member 74, second conveying rollers 75, third conveying rollers 76, a second pressing member 77 and fourth conveying rollers 78 are provided in the order in the conveying direction. Here, members dedicated to the double-sided reading specification are the first conveying rollers 71, the document detection sensor 72 and the contact image sensor 73.

The feed holder 70 is stored in the holder storage recess 60 of the outer cover 44A. The feed holder 70 is formed into an approximately parallelepiped rectangular box shape whose lower face is opened, as shown in FIG. 5 and FIG. 6. Through a left end portion of the feed holder 70, a drive shaft 81 is penetrated. The feed holder 70 is supported by the drive shaft 81 in a turnable manner in the upper-lower direction. Both ends of the drive shaft 81 are supported by the front and rear side plates 41 and 42 in a rotatable manner. Between the feed holder 70 and the drive shaft 81, a torque limiter (not shown) is provided. When a torque acting on the feed holder 70 from the drive shaft 81 is smaller than a predetermined value, the torque limiter transmits a rotation of the drive shaft 81 to the feed holder 70 to turn the feed holder 70 together with the drive shaft 81. When the torque exceeds the predetermined value, the torque limiter idles the drive shaft 81 with respect to the feed holder 70.

The feed holder 70 supports a feed roller 82 and a pickup roller 83. The feed roller 82 is supported by the drive shaft 81 via a one-way clutch (not shown) in a rotatable manner. The one-way clutch transmits the rotation of the drive shaft 81 in the conveying direction (the clockwise direction in FIG. 3 and FIG. 4) to the feed roller 82 and rotates the feed roller 82 together with the drive shaft 81 in the conveying direction. The one-way clutch idles the feed roller 82 with respect to the drive shaft 81 when the feed roller 82 is rotated in the conveying direction by being driven by the document conveyed in the conveying direction. The pickup roller 83 is coupled to the drive shaft 81 via an idle gear or a timing belt (not shown) such that the rotation of the drive shaft 81 is transmitted to the pickup roller 83.

The first to fourth conveying rollers 71, 75, 76 and 78 respectively have drive rollers 71a, 75a, 76a and 78a and driven rollers 71b, 75b, 76b and 78b. As shown in FIG. 3 and FIG. 5, the drive rollers 71a, 75a, 76a and 78a are supported by the inner guide plate 43 in a rotatable manner, and expose to the guide face 43a through the first to fourth conveying roller openings 51, 54, 55 and 57 respectively. The driven rollers 71b, 75b and 76b of the first to third conveying rollers 71, 75 and 76 are supported by the first to third conveying roller storage recesses 61, 63 and 64 of the outer cover 44A in a rotatable manner, and pressed against the first to third drive rollers 71a, 75a and 76a. The driven roller 78b of the fourth conveying rollers 78 is supported by the conveying roller storage recess 34 of the outer guide plate 32 in a rotatable manner, and pressed against the forth drive roller 78a. When each drive roller are rotated, each driven roller is driven to be rotated in a direction opposite to the rotating direction of each drive roller.

As shown in FIG. 7, the document detection sensor 72 includes an actuator 85 and an optical sensor 86. The actuator 85 has a rotating shaft 85a and an abutment piece 85b rotated together with the rotating shaft 85a. Both ends of the rotating shaft 85a are supported by the bearing holes of the bearing pieces 58 of the inner guide plate 43 in a rotatable manner. The abutment piece 85*b* is turned to the downstream side of the conveying direction from a protruding position where it protrudes above the guide face 43*a* through the document detection sensor opening 52 to a retracting position where it retracts under the guide face 43*a*. The actuator 85 biases by a biasing member (not shown) so as to be turned into the protruding position. When the leading edge of the document conveyed along the conveying path 21 abuts on the abutment piece 85*b*, the actuator 85 is turned into the retracting position from the protruding position against a biasing force of the biasing member.

The optical sensor 86 has a light projecting part and a light receiving part. The optical sensor 86 is attached on the face opposite to the guide face 43*a* of the inner guide plate 43. When the abutment piece 85*b* is turned into the retracting position, it passes a space between the light projecting part and the light receiving part of the optical sensor 86. When a light projected from the light projecting part is blocked by the abutment piece 85*b*, it is detected that the document is conveyed on the conveying path 21.

As shown in FIG. 3, the contact image sensor 73 is stored in the reading sensor storage recess 53 of the inner guide plate 43. The reading sensor storage recess 53 is covered with a contact glass 88.

The first pressing member 74 is a shallow rectangular parallelepiped hollow member long in the width direction. The first pressing member 74 is stored in the pressing roller storage recess 62 of the outer cover 44A, and is pressed against the contact glass 88 by a biasing member.

The second pressing member 77 is a shallow rectangular parallelepiped hollow member long in the width direction. The second pressing member 77 is stored in the pressing member storage recess 56 of the inner guide plate 43, and is pressed against the contact glass 12 of the reading unit 5 through the window 31 by a biasing member.

Next, the conveying path 21 for the single-sided reading specification will be described with reference to FIG. 4, FIG. 6 and FIG. 8. On the conveying path 21, the feed holder 70, a first cover plate 90 as an example of a cover member, a second cover plate 91, the second conveying rollers 75, the third conveying rollers 76, the second pressing member 77 and the fourth conveying rollers 78 are arranged in the order in the conveying direction.

The feed holder 70, the second to fourth conveying rollers 75, 76 and 78, and the second pressing member 77 are formed in the same way as the double-sided reading specification. On the other hand, in the single-sided reading specification, the first cover plate 90 is provided in place of the first conveying rollers 71 and the document detection sensor 72, and the second cover plate 91 is provided in place of the contact image sensor 73.

Figure 9A:
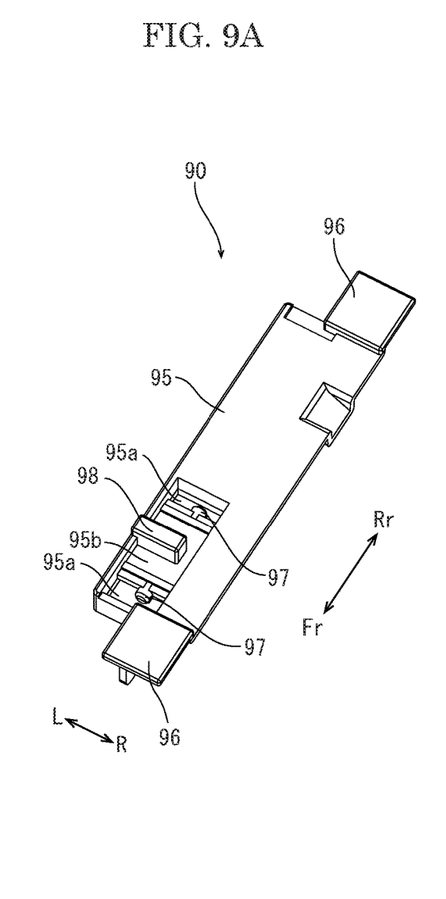
FIG. 9A is an upper side perspective view showing a first cover plate, in the document conveying device according to the embodiment of the present disclosure.
Figure 9B:
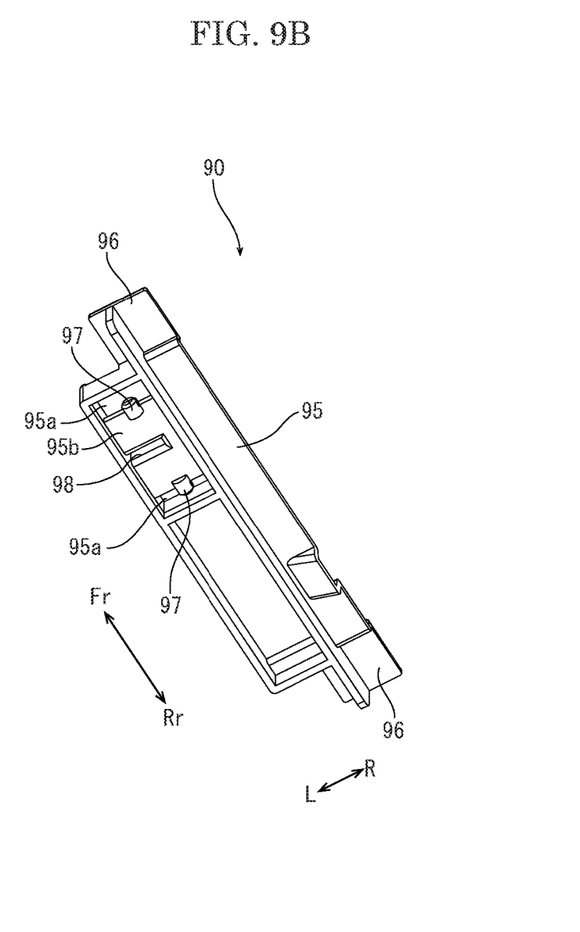
FIG. 9B is a lower side perspective view showing the first cover plate, in the document conveying device according to the embodiment of the present disclosure.

The first cover plate 90 will be described with reference to FIG. 9A and FIG. 9B. FIG. 9A is a perspective view showing the first cover plate when viewed from the upper side and FIG. 9B is a perspective view showing the first cover plate when viewed from the lower side.

The first cover plate 90 is a plate like member long in the width direction, and has a base part 95 at a center in the width direction and a pair of first closing parts 96 at both ends in the width direction. On a left front corner portion of the base part 95, two openings 95*a* along the conveying direction are formed at a predetermined interval in the width direction. Between the two openings 95*a*, a table portion 95*b* is formed. On both side faces of the table portion 95*b* in the width direction, supporting shafts 97 are formed protruding in the openings 95*a* on the same axis. On an upper face of the table portion 95*b*, a second closing part 98 is protruded.

The second closing part 98 is formed into a parallelepiped rectangular shape long in the conveying direction.

The first closing parts 96 each have a rectangular plan shape, and extend in opposite directions in the width direction from step portions stood along right half portions of side edges of the base part 95 in the width direction. Upper faces of the first closing parts 96 and an upper face of the second closing part 98 are on the same plane higher than the upper face of the base part 95.

When the first cover plate 90 is attached to the inner guide plate 43, the first closing parts 96 are positioned so as to correspond to the openings of the first conveying roller opening 51 from an inside of the inner guide plate 43 (from the side opposite to the guide face 43*a*). After that, as the supporting shafts 97 are fitted in a space between the bearing pieces 58, the bearing pieces 58 begins to be elastically deformed outward. Then, when the first closing parts 96 are fitted into the openings of the first conveying roller opening 51 and also the second closing part 98 is fitted into the document detection sensor opening 52, the bearing pieces 58 are elastically returned inward and the supporting shafts of the first cover plate 90 are fitted into the bearing holes of the bearing pieces 58. Thereby, the openings of the first conveying roller opening 51 are closed with the first closing parts 96 and the document detection sensor opening 52 is closed with the second closing part 98. Additionally, the first closing parts 96 and the second closing part 98 forms a part of the inner circumference side guide face of the conveying path 21 (the guide face 43*a* of the inner guide plate 43).

The second cover plate 91 is a plate like member having a shape capable of closing the reading sensor storage recess 53.

In the document conveying device 3 having the above described configuration, document conveying operations for the double-sided reading specification and the single-sided reading specification will be described. In the both specifications, during a standby state, the feed holder 70 is turned upward around the drive shaft 81, and a space is formed between the pickup roller 83 and the document placement portion 50. Through the space, the documents are placed on the document placement portion 50 and the document placement part 23. The placed documents are aligned in the width direction by the side cursors 38.

The document conveying operation for the double-sided reading specification will be described with reference to FIG. 3. When the document conveying is started, the drive shaft 81 rotates in the clockwise direction of FIG. 3 to turn the feed holder 70 downward. Then, the pickup roller 83 abuts on an upper face of the documents placed on the document placement portion 50. After that, the pickup roller 83 is driven by the drive shaft 81 to be rotated in the clockwise direction of FIG. 3 to feed the uppermost document toward the conveying path 21. At the same time, the feed roller 82 is rotated together with the drive shaft 81 to feed the document fed by the pickup roller 83 into the conveying path 21.

The fed document is applied with a conveying force by the first conveying rollers 71. After the document is passed through the first conveying rollers 71, the leading edge of the document abuts on the abutment piece 85*b* of the actuator 85, the abutment piece 85*b* protruding upward above the guide face 43*a* of the inner guide plate 43. Then, the actuator 85 is turned to the downstream side in the conveying direction against the biasing force of the biasing member, and the abutment piece 85*b* is passed through the space between the light projecting part and the light receiving part of the optical sensor 86. As a result, it is detected by the optical sensor 86 that that the leading edge of the document is passed.

At a suitable timing after it is detected that the leading edge of the document is passed, the image on the back face of the document is read by the contact image sensor 73. At this time, the document is conveyed at a stable conveying speed by the first conveying rollers 71 and is pressed against the contact glass 88 by the first pressing member 74 so that the image on the back face can be correctly read.

After that, the document is conveyed to the window 31 by the second and third conveying rollers 75 and 76, and the image on the front face of the document is read by the contact image sensor 13 of the reading unit 5 at the window 31. At this time, the document is pressed against the contact glass 12 by the second pressing member 77 so that the image on the front face can be correctly read. After the images on the both sides of the document are read, the document is ejected by the fourth conveying rollers 78 into the ejection tray 33.

Next, the document conveying operation for the single-sided reading specification will be described with reference to FIG. 3, FIG. 4 and FIG. 6. When the double-sided reading specification is changed into the single-sided reading specification, the outer cover is replaced from the double-sided reading type outer cover 44A (refer to FIG. 3) into the single-sided reading type outer cover 44B (refer to FIG. 4).

In addition, the drive roller 71a of the first conveying rollers 71, the document detection sensor 72, the contact image sensor 73 and the contact glass 88 are removed from the inner guide plate 43.

After that, the supporting shafts 97 of the first cover plate 90 are supported by the bearing pieces 58 of the inner guide plate 43, as described above, and, as shown in FIG. 6, the openings of the first conveying roller opening 51 are closed with the first closing parts 96 and the document detection sensor opening 52 is closed with the second closing part 98. Additionally, the reading sensor storage recess 53 is closed with the second cover plate 91. In this way, the first conveying roller opening 51 and the document detection sensor opening 52 remained after the first conveying rollers 71 and the document detection sensor 72, which are used for the double-sided reading specification only, are removed are closed with the first closing parts 96 and the second closing part 98, respectively.

Additionally, the reading sensor storage recess 53 remained after the contact image sensor 73 and the contact glass 88, which are used for the double-sided reading specification only, are removed is closed with the second cover plate 91. Thereby, the first cover plate 90 and the second cover plate 91 can form a part of the guide face 43a of the inner guide plate 43.

As described above, in the document conveying device 3 according to the present disclosure, the document detection sensor 72 only used for the double-sided reading specification and the first cover plate 90 only used for the single-sided reading specification are detachably attached to the bearing pieces 58 of the inner guide plate 43 so that it becomes easy to change from the double-sided reading specification into the single-sided reading specification or from the single-sided reading specification into the double-sided reading specification. Additionally, the inner guide plate 43 can be used in common for the double-sided reading specification and the single-sided reading specification so that it becomes possible to decrease a cost.

Furthermore, by supporting the first cover plate 90 to the bearing pieces 58, the first cover plate 90 closes not only the document detection sensor opening 52 but also the first conveying roller opening 51 so that there is no need for preparing a member for closing the first conveying roller opening 51. Accordingly, a number of the members can be reduced.

The first cover plate 90 is attached to the inner guide plate 43 from the inside of the inner guide plate 43 so that the first cover plate 90 is not exposed to the guide face 43a other than the first conveying roller opening 51 and the document detection sensor opening 52. Thereby, even if the first cover plate 90 is attached, the document can be smoothly conveyed along the guide face 43a.

While the preferable embodiment and its modified example of the document conveying device and the image forming apparatus of the present disclosure have been described above and various technically preferable configurations have been illustrated, a technical range of the disclosure is not to be restricted by the description and illustration of the embodiment. Further, the components in the embodiment of the disclosure may be suitably replaced with other components, or variously combined with the other components. The claims are not restricted by the description of the embodiment of the disclosure as mentioned above.

The invention claimed is:

1. A document conveying device used in common for a double-sided reading specification in which images on one face and the other face of a document conveyed along a conveying path are read and for a single-sided reading specification in which the image on the one face of the document is read, the document conveying device comprising:

a recess in which a member dedicated to the double-sided reading specification is supported;

a cover member which closed the recess;

a supporting part by which the member dedicated to the double-sided reading specification or the cover member is supported; and a guide member guiding the other face of the document along the conveying path, wherein the member dedicated to the double-sided reading specification includes a document detection sensor, the document detection sensor having an abutment piece and a rotating shaft to which the abutment piece is supported, the document detection sensor configured to detect the document when the document abuts on the abutment pieces and rotates the abutment piece, the recess includes a document detection sensor opening formed in the guide member, the supporting part has an elastically deformable bearing part protruding from the guide member to a side opposite to the conveying path and, wherein when the rotating shaft is supported by the bearing part, the abutment piece protrudes on the conveying path through the detection sensor opening, and when the cover member is supported by the bearing part, the detection sensor opening is closed by the cover member in the single-sided reading specification, the rotating shaft of the document detection sensor is supported by the bearing part such that the abutment pieces protrudes on the conveying path through the document detection sensor opening, and in the single-sided reading specification, the cover member is supported by the bearing part to close the document detection sensor opening.

2. The document conveying device according to claim 1, wherein the cover member includes:

a closing part; and a supporting shaft, wherein when the supporting shaft is supported by the bearing part, the sensor opening is closed with the closing part.

3. The document conveying device according to claim 1, wherein the cover member is supported by the bearing part from the side opposite to the conveying path.

4. The document conveying device according to claim 1, wherein the member dedicated to the double-sided reading specification includes a conveying roller, the recess includes a conveying roller opening formed in the guide member, wherein when the conveying roller is supported by the guide member, the conveying roller protrudes on the conveying path through the conveying roller opening, and when the cover member is supported by the bearing part, the conveying roller opening is closed with the cover member.

5. The document conveying device according to claim 4, wherein the cover member includes:

a first closing part;

a second closing part; and a supporting shaft, wherein when the supporting shaft is supported by the bearing part, the conveying roller opening is closed with the first closing part and the document detection sensor opening is closed with the second closing part.

6. An image forming apparatus forming an image based on an image on the document conveyed by the document conveying device according to claim 1.

\* \* \* \* \*